Figure 1:
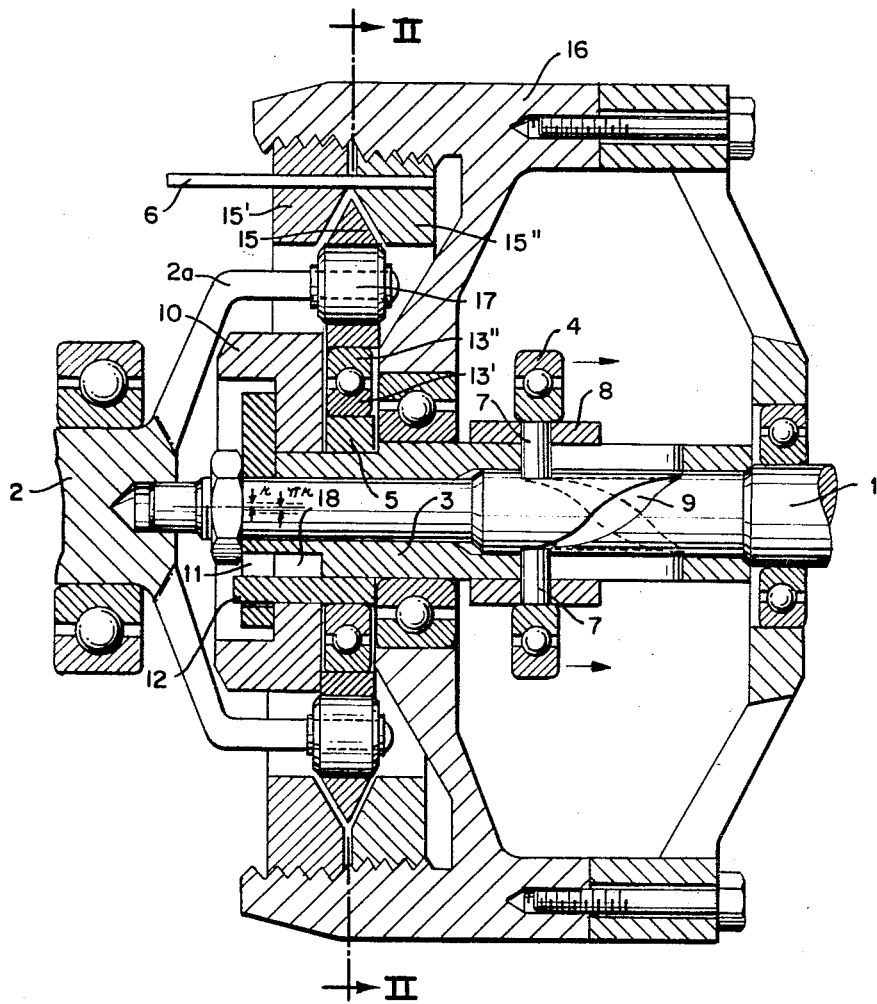

June 13, 1967     V. L. KARI     3,324,746
STEPLESSLY CONTROLLED DIFFERENTIAL REDUCER COUPLING
Filed April 21, 1964     2 Sheets-Sheet 1

INVENTOR
VEIKKO LEONARD KARI
ATTORNEYS

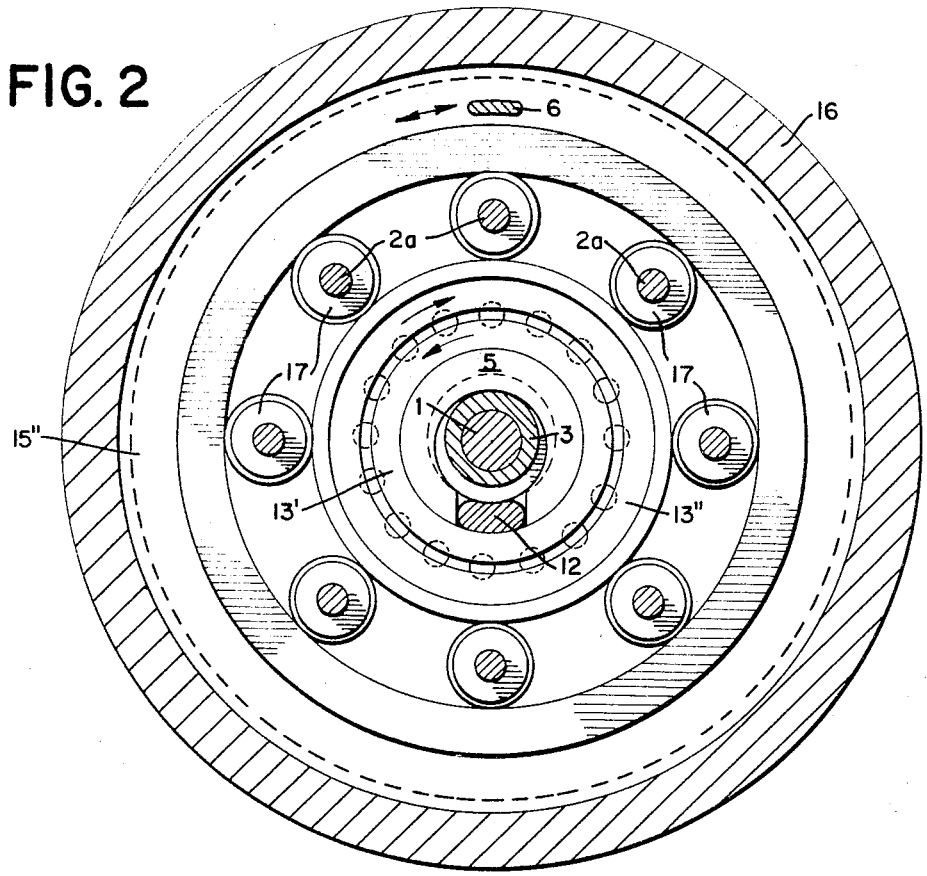
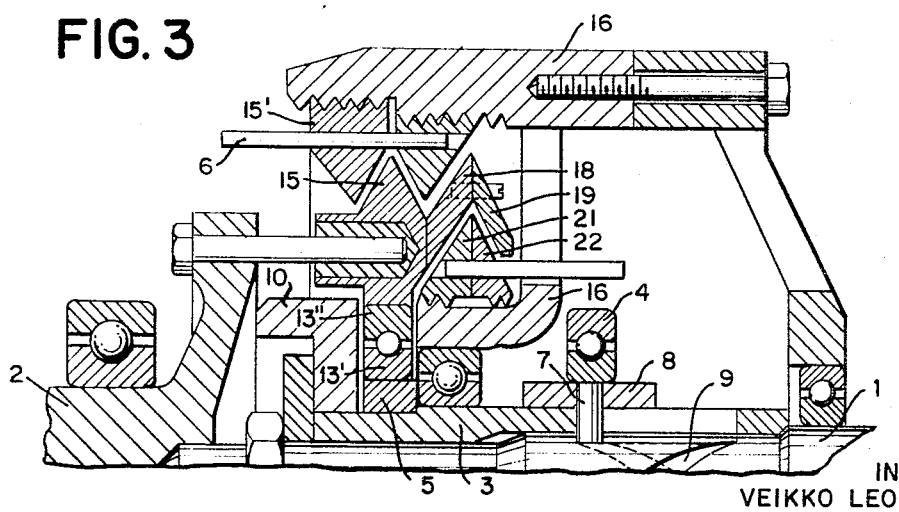

3,324,746
STEPLESSLY CONTROLLED DIFFERENTIAL
REDUCER COUPLING
Veikko Leonard Kari, Kotkankatu 13,
Hameenlinna, Suomi, Finland
Filed Apr. 21, 1964, Ser. No. 361,522
Claims priority, application Finland, Apr. 26, 1963,
831/63
5 Claims. (Cl. 74—796)

For power transmission, for instance in a motor car, from the motor shaft to the wheels, or generally from a driving shaft to a driven shaft, when the speed of the driving shaft is to be reduced to a suitable speed for the driven shaft, generally a reducer system is used consisting of a combination of gear wheels. In these gear systems the regulation of the reduction ratio is effected by coupling the different gear wheels of the gear system on and off by means of the gear lever, that is to say, stepwise. Particularly for motor cars there are even automatic gear systems, in which the changing and coupling takes place totally or partially automatically, either hydraulically or mechanically. Among these apparatus there are some, in which the regulation is stepless, but these have great friction as drawback.

Particularly in the case of gas turbine driven motor cars, in which the speed of the driving shaft is relatively high, for instance about 60,000 r.p.m., a reducer system based on the gear wheel principle is difficult to realize. Especially the regulation of speeds from zero to for instance a few hundred r.p.m. is difficult mechanically to achieve steplessly and in such a manner as to allow selection of any of the low speeds, if for instance power transmission to a working implement of the like is in question.

The invention relates to a steplessly regulable differential reducer coupling, which is characterized in that it includes a means providing a non-rotating, surface of rolling contact, the diameter of which can be controllably increased and decreased, and a rolling wheel to be brought into contact with said surface, the said wheel being freely mounted on the driving shaft, and connected with the driving shaft, to which wheel the driving shaft is adapted to give an eccentric movement of controlled magnitude in order to bring the rolling wheel in a rolling movement along the rolling surface, regulated to corresponding diameter. In order to regulate the diameter of the surface of rolling contact, the same is formed by two rings, which are co-axial with the driving shaft and of equal diameter, which rings between themselves form a preferably wedge shaped groove, defined by the rolling contact surface, and which rings can, supported on their stationary holder, be screwed, in the direction of the driving shaft, toward or away from each other to increase or decrease the wedge shaped groove.

The eccentric movement of the rolling wheel in relation to the driving shaft is achieved for instance by means of a hollow eccentric shaft, turnably mounted on the driving shaft and rotating with the same, and of an eccentric ring, freely mounted on the said eccentric shaft and rotating with the driving shaft, the eccentricities of these two being selected so as to allow stepless regulation of the eccentricity of a rolling ring freely mounted on the eccentric ring, in relation to the driving shaft, from zero to the maximum value.

In order to balance the centrifugal force due to the eccentricity it can be favourable to mount on the eccentric shaft another eccentric ring, the eccentricity of which is 180 degrees removed in relation to the eccentricity of the first eccentric ring, and to fit a corresponding ring to the frame. A balance wheel can be substituted for the above.

In the accompanying drawings two embodiments of the invention are shown by way of example, FIG. 1 showing the differential reducer coupling seen from the side and mainly in section; whereas FIGURE 2 shows a section of the same along the line II—II of FIGURE 1 and FIGURE 3 shows a modified reducer coupling, which otherwise corresponds to the upper part of FIGURE 1.

In the drawings reference number 1 refers to the driving shaft, and number 2 refers to the driven shaft, the speed of which is supposed to be steplessly regulated for instance to 0–600 r.p.m., when for instance the speed of a turbine driven shaft is very great, for instance 60,000 r.p.m.

To the free end of the driving shaft 1 a hollow eccentric shaft 3 is mounted and by means of pins 7, attached to a regulating sleeve 8 and penetrating through the eccentric shaft 3, attached to the shaft 1 to rotate together with the same. The eccentric shaft 3 can be turned in relation to shaft 1 by moving the pins 7 together with their bearing 4 axially in relation to shaft 1, in which case the pins 7 will slide in the spiral grooves 9 of the shaft. To the free end of shaft 1 a turning plate 11 is fixed, which plate has a radial opening, into which a pin 12 extends axially from an eccentric ring 5 fitted on the eccentric shaft 3. This pin transmits the movement of shaft 1 to the ring 5, which accordingly rotates with the same speed as the driving shaft 1 and the eccentric shaft 3. In FIGure 2 the elements 3 and 5 are shown in such a relative position, that the periphery of element 5 is co-centric with the shaft 1. If however the eccentric shaft 3 is by means of the element 4 turned in relation to shaft 1, the shaft 3 will turn in relation to the eccentric ring steplessly, until the eccentricity attains its maximum when the shaft 3 has been turned 180 degrees. Then also the inner ring 13' of a ball bearing, attached to the outer periphery of the eccentric ring, will rotate with the shaft 1 correspondingly eccentrically. On the other hand, the outer ring 13" of the ball bearing and the rolling wheel 14 attached to the same do not participate in the rotational movement of shaft 1, but due to its eccentric position in relation to shaft 1, they move also according to the eccentricity.

A surface of rolling contact is formed by two rings 15' and 15" of equal diameter, which both are, one with left-handed threads and the other with right-handed threads, attached to a non-rotating frame 16, the inner surface of which is co-axial with the shaft 1. The faces of the rings which are directed toward each other are bevelled and form between themselves a wedge shaped groove receiving a correspondingly shaped periphery 15, of a rotary wheel 14. These bevelled surfaces function as a rolling contact surface on which the edge of the rolling wheel 14, correspondingly bevelled, rolls. By moving the rings 15' and 15" toward or away from each other in direction of shaft 1, the diameter of the inner periphery of the rings 15'–15", coming into contact with the rolling wheel 14, can be decreased or increased. The moving of the rings can be accomplished for instance by means of the pin 6 shown in the drawing. The turning direction of the rings 15'-15" is selected to be opposite to the rotation direction of the shaft 1 to prevent locking of the reducer in case of trouble but to set the shaft 2 free instead.

As seen from FIGURE 3 the rolling periphery 15 may also be provided with laterally applied rings 18, 19 for driving backwards. For this purpose the frame 16a correspondingly includes a bearing part with an adjustable surface of rolling contact, composed of the parts 21 and 22. These additional parts act in manner similar to the action of the parts 14, 15, 15' and 15", except that the rotational movement is opposite to that of the last mentioned parts.

When the eccentricity of the wheel 14 in relation to the shaft 1 is selected to correspond to the diameter of the rolling contact surface, the periphery 15 of the wheel 14 will contact the surface of rolling contact always at one point. During each revolution of shaft 1 the wheel 14 rolls along the surface of rolling contact a distance, which is proportional to the eccentricity, in the opposite direction in relation to the direction of the rotation of shaft 1. This movement is rolling, because the wheel 14 is freely mounted on the elements 1, 3 and 5, and does not follow their rotation, but attains only a turning movement corresponding to their eccentricity, while rolling along the surface of rolling contact. If for instance the diameter of the rolling wheel 14 is 100 mm. and its eccentricity 1 mm., the diameter of the rolling periphery must be 101 mm., in which case, during each revolution, the rolling wheel is moved on the rolling contact surface a distance corresponding to the difference of the lengths of the respective peripheries, in a direction opposite to that of the rotation of shaft 1. The rotational movement the rolling wheel attains is accordingly proportional to the eccentricity, the value $r$, and since the difference between the diameters of the rolling contact surface and the rolling wheel is indicated by $r$, the rolling wheel turns during each revolution of the shaft 1, a distance $\pi r$ along the rolling contact surface axially in relation to shaft 1. The arms 2a are attached to the rolling wheel 14, and transmit the movement to the driven shaft 2. The attachment of the arms to the rolling wheel 14 is elastic and achieved for instance by means of rubber bushes 17, which are fitted in the rolling wheel 14 at equal distances, corresponding to the arms 2a.

For elimination of the eccentric forces either another eccentric ring, which is mounted 180 degrees removed in relation to the eccentric ring 5, with corresponding rolling periphery can be utilized, or alternatively a balance wheel 10, as shown in the drawing.

The control of the reducer coupling shown in the drawing is as follows. When the driving shaft 1 rotates controlled by its own regulator (not shown) at a constant speed, another regulator (not shown), mounted on the driven shaft 2 is made to control the two control elements (the pins 6 and 7) of the reducer simultaneously, but in a manner not to allow the reducer to pull, although it is set to a reducing ratio corresponding to the speed of the shaft. By arranging a connection mechanism between the control elements 6 and 7, which mechanism can be controlled by the operator of the machine, for instance a motor car, it is possible for the operator by means of this mechanism to make the reducer pull or to set it free, whether the motor car is stationary or travels at any speed. The setting of the eccentricity or of the rolling contact surface or of both of them is then controlled by the regulator on the driven shaft 2. This can be done manually or in some other suitable manner as well. By suitably regulating the eccentricity or the diameter of the rolling contact surface the necessary pressure for the rolling friction is generated.

What I claim is:

1. A steplessly regulated differential reducer coupling comprising a nonrotating surface of rolling contact having a diameter which can be controllably increased or decreased, and a rolling wheel to be brought into contact with said surface, a driving shaft with respect to which said wheel is freely rotatable, a driven shaft operatively connected with the said wheel for rotation therewith, eccentric means carried by said driving shaft and supporting said rolling wheel for free rotation with respect to said driving shaft, first adjusting means operatively connected to said eccentric means for transmitting from said driving shaft to said rolling wheel an eccentric movement of controllable magnitude in order to bring the rolling wheel into a rolling movement along the surface of rolling contact, and second adjusting means operatively connected with said surface of rolling contact for adjusting the latter to a diameter corresponding to the magnitude of eccentric movement of said rolling wheel, said surface of rolling contact being formed by two rings, coaxial with said driving shaft and of equal diameter, which between themselves form a wedge-shaped groove defined by said surface of rolling contact, said rings having threads at theiir outer peripheries, a stationary frame surrounding and being in threaded engagement with said threaded peripheries of said rings for supporting said rings for movement toward and away from each other in response to turning thereof with respect to said frame, said second adjusting means being operatively connected with said rings for turning them with respect to said frame so as to move said rings axially in relation to the driving shaft toward or away from each other.

2. A steplessly regulated differential reducer coupling comprising a non-rotating surface of rolling contact having a diameter which can be controllably increased or decreased and a rolling wheel to be brought into contact with said surface, a driving shaft with respect to which said wheel is freely rotatable, a driven shaft operatively connected with said wheel for rotation therewith, eccentric means carried by said driven shaft and supporting said rolling wheel for free rotation with respect to said driving shaft, first adjusting means operatively connected to said eccentric means for transmitting from said driving shaft to said rolling wheel an eccentric movement of controllable magnitude in order to bring the rolling wheel into rolling movement along the surface of rolling contact, and second adjusting means operatively connected with said surface of rolling contact for adjusting the latter to a diameter corresponding to the mangitude of eccentric movement of said rolling wheel, said eccentric movement of the rolling wheel in relation to the driving shaft being achieved by means of an eccentric element forming part of said first adjusting means and turnable in relation to the driving shaft, said eccentric element being in the form of a hollow eccentric shaft turnably mounted on said driving shaft, the latter being formed with at least one helical groove and said hollow eccentric shaft carrying a pin received in said groove so that turning of said hollow shaft with respect to said driving shaft will adjust the eccentricity.

3. A reducer coupling according to claim 2, and including an eccentric ring also forming part of said first adjusting means, freely mounted on the said eccentric shaft and rotating with the driving shaft, the eccentricities of these two being selected so as to make it possible to regulate the eccentricity of said rolling wheel, freely mounted on the eccentric ring, in relation to the driving shaft, steplessly between zero and the maximum value.

4. A reducer coupling according to claim 3 in whch a balance wheel is mounted on the driving shaft in a position 180 degrees removed in relation to the eccentric ring and destined to eliminate the eccentric forces.

5. A reducer coupling according to claim 1 in which the driven shaft is positioned co-axially with the driving shaft and connected with the rolling wheel by means of arms, attached to the same at equal peripheral distances.

(References on following page)

References Cited

UNITED STATES PATENTS

| | | | |
|---|---|---|---|
| 1,910,777 | 5/1933 | Soddy | 74—804 |
| 2,035,582 | 3/1936 | Winger | 74—796 |
| 2,831,373 | 4/1958 | Weis | 74—796 |
| 2,837,937 | 6/1958 | Kraus | 74—804 |
| 2,868,039 | 1/1959 | Lee | 74—796 X |
| 2,883,883 | 4/1959 | Chillson | 74—796 X |
| 3,085,450 | 4/1963 | Graham et al. | 74—796 |
| 3,190,148 | 6/1965 | Flichy | 74—804 |

FOREIGN PATENTS 923,071  4/1963  Great Britain.

DONLEY J. STOCKING, *Primary Examiner.*

DAVID J. WILLIAMOWSKY, *Examiner.*

J. R. BENEFIEL, *Assistant Examiner.*